(No Model.)　　　　　　　　　　　　　　　　2 Sheets—Sheet 1.
P. J. GATES.
FIRE ESCAPE AND DETACHABLE HOOK.
No. 580,454.　　　　　　　　　　　Patented Apr. 13, 1897.

(No Model.) 2 Sheets—Sheet 2.

P. J. GATES.
FIRE ESCAPE AND DETACHABLE HOOK.

No. 580,454. Patented Apr. 13, 1897.

WITNESSES
H. J. Koerth.
J. C. Tappan

INVENTOR
Parker J. Gates
by John Wedderburn
Attorney

UNITED STATES PATENT OFFICE.

PARKER J. GATES, OF WEST NEW BRIGHTON, NEW YORK.

FIRE-ESCAPE AND DETACHABLE HOOK.

SPECIFICATION forming part of Letters Patent No. 580,454, dated April 13, 1897.

Application filed October 26, 1896. Serial No. 610,090. (No model.)

*To all whom it may concern:*

Be it known that I, PARKER J. GATES, a citizen of the United States, residing at West New Brighton, in the county of Richmond and State of New York, have invented certain new and useful Improvements in Fire-Escapes and Detachable Hooks; and I do hereby declare the following to be a full, clear, and exact description of the invention, such as will enable others skilled in the art to which it appertains to make and use the same.

This invention has reference to a novel construction of a suspending-hook and rope ladder, the object being to provide a combined rope ladder and hook that can be attached to any projection of a building and readily detached therefrom, from the ground or any other point below the hook.

The invention consists of the features of construction hereinafter specifically described and claimed.

Figure 1:
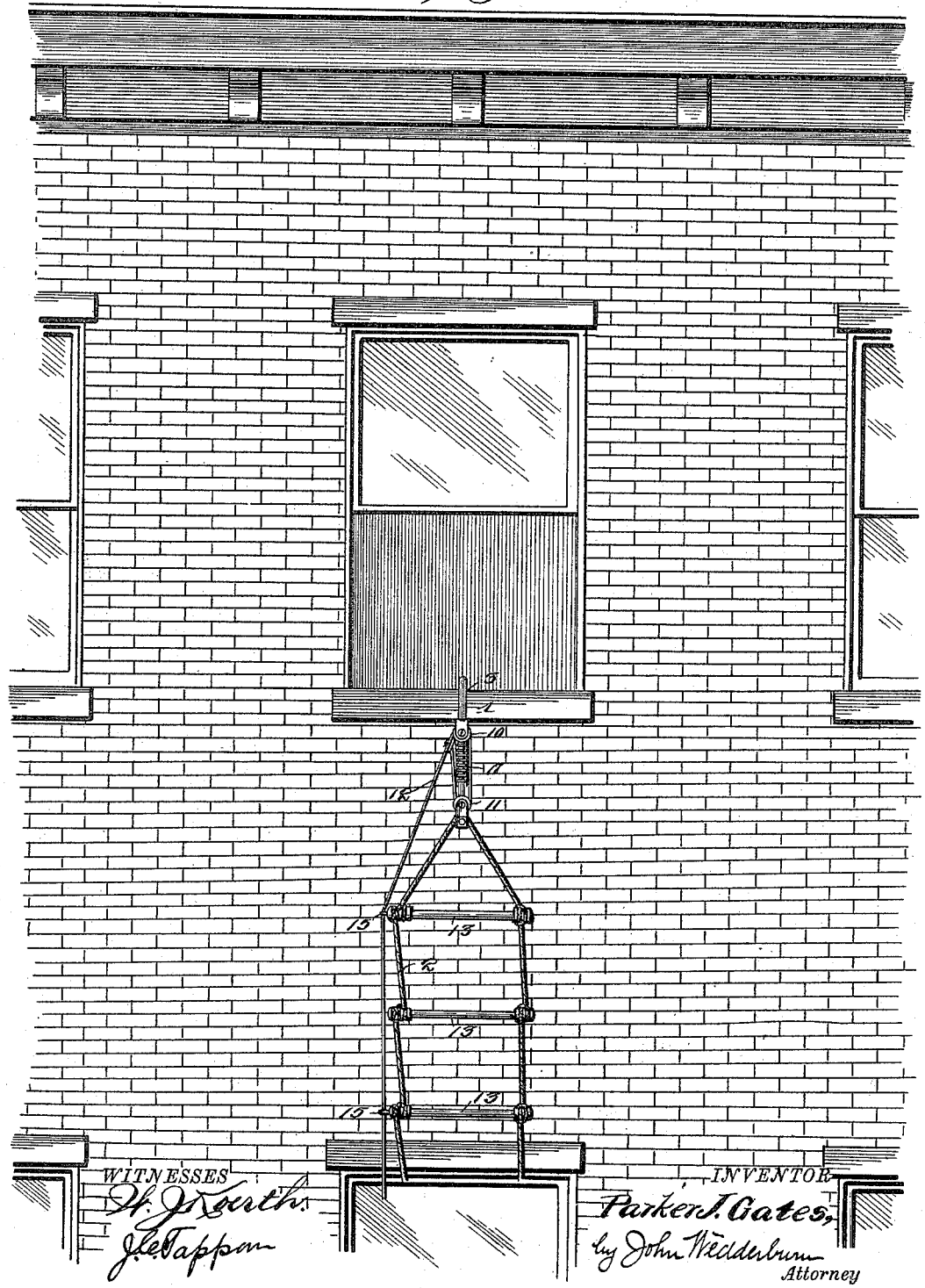
Figure 2:
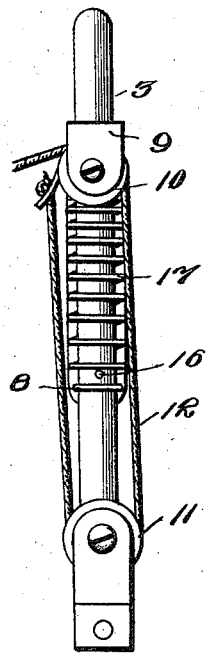
Figure 3:
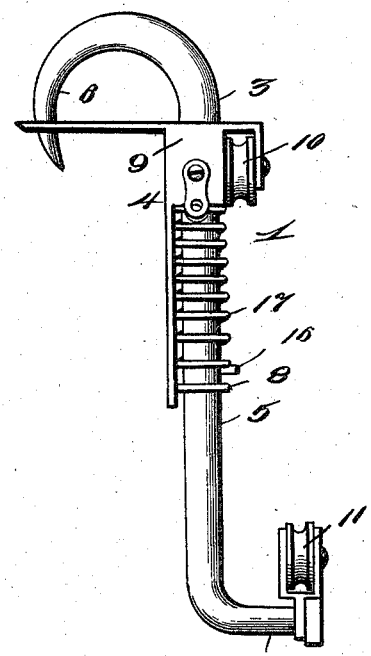
Figure 5:
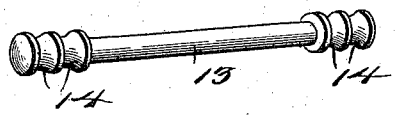
Figure 4:
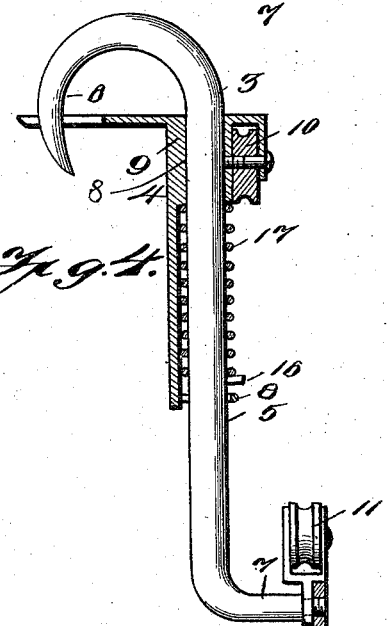

In the accompanying drawings, forming a part of this specification, Figure 1 is a face view of a portion of a building with this invention hooked to a window-sill thereof. Fig. 2 is a detail end elevation of the hook on an enlarged scale. Fig. 3 is a side elevation of the same. Fig. 4 is a vertical section. Fig. 5 is a detail perspective view of one of the rungs of the rope ladder, taken on an enlarged scale.

Referring now to said drawings, 1 indicates the hook, and 2 the rope ladder. The said hook 1 consists of two relatively-movable members 3 and 4. The member 3 of the hook comprises a spindle 5, having a hook 6 at its upper end and a hook 7 at its lower end. The member 4 is provided at its upper end with a head 9, having a laterally-projecting lip provided at its upper end with an open slot. The said spindle 5 of the member 3 moves in guides 8 upon the member 4, and these guides consist, preferably, of an opening through the head and a loop near the lower end of the member. The hook 6 at the upper end of member 3 is situated to enter the open slot at the end of the finger, and the head 9 is provided with a pulley 10. The lug 7 on the lower end of the spindle is also provided with a pulley 11, as shown, and a cable 12 is fastened to one end of the head 9, then passes downwardly and around the lower pulley 11, thence upwardly and around the upper pulley 10, and thence to the point from which the hook is to be operated. Situated between the projection 16 upon said spindle 5 and the lower face of the head 9 is a spring 17, acting by expansion and which tends to move the member 4 toward the hook end of the spindle.

The rope ladder 2 is suspended from the lug 7 of the member 3 and may be of ordinary construction or of the construction illustrated in the drawings, which consists of wooden rungs 13, having at each end thereof two grooves 14, within which are situated the side strands of the ladder.

The cable 12, that operates the hook, passes through suitable guide-rings 15, attached to the side of this ladder, so that the cable is always in position to be operated from the ladder.

The manner in which this fire-escape is used is as follows: The parts being in the position shown in Fig. 1, it is readily seen that the hook can be fastened to any projection in an obvious manner, so that the rope ladder will be suspended therefrom. After a person has descended and when it is desired to move the ladder and hook it will be seen that by pulling on the cable 12 the member 4 is first moved downwardly, the spring 17 being contracted to allow this movement, until the projecting end of the head 9 of this member 4 comes in contact with the projection supporting the hook. By a further pull upon the spring it will be seen that the head 9 becomes immovable and that the member 4 is raised so that the hook 6 is withdrawn from the wood or material into which it projects, and as it leaves this wood or material entirely the hook can be easily pulled from the projection.

A fire-escape made in this manner will occupy little space and can be quickly and safely applied, while it will be understood that the hook can be used in connection with other forms of rope ladder or with a mere rope.

Having thus described my invention, what I claim as new, and desire to secure by Letters Patent, is—

1. The combination with a detachable hook consisting of two relatively-movable members secured together and a spring for moving said members in one direction, of a rope ladder secured to one of said members, and a cable operatively connected with both of said members and adapted to move them in opposition to the spring situated within guides upon said members and upon said rope ladder.

2. A hook consisting of two relatively-movable members secured together, one of said members being provided with a laterally-extending finger having an open slot and the other with a hook to extend through the same, a spring for moving said members in one direction, and an operating-cable secured to one of said members and passing around pulleys on both of said members.

3. A hook consisting of two members, one of said members having a slotted head, guides and a pulley, while the other member is situated to slide in said guides, and is provided with a hook to enter said slotted head, and is provided at its lower end with a lug having a pulley, a spring situated between said members to move them in one direction, and an operating-cable secured to one of said members and passing around said pulley, substantially as described.

In testimony whereof I have signed this specification in the presence of two subscribing witnesses.

PARKER J. GATES.

Witnesses:
JOHN HOLZHAMER,
JOHN H. BAILEY.